United States Patent
Hayashida

(10) Patent No.: US 10,543,856 B2
(45) Date of Patent: Jan. 28, 2020

(54) VEHICLE AIR-CONDITIONING APPARATUS AND RAILROAD VEHICLE INCLUDING THE SAME

(71) Applicant: MITSUBISHI ELECTRIC CORPORATION, Chiyoda-ku, Tokyo (JP)

(72) Inventor: Tomoki Hayashida, Tokyo (JP)

(73) Assignee: MITSUBISHI ELECTRIC CORPORATION, Chiyoda-Ku, Tokyo (JP)

( * ) Notice: Subject to any disclaimer, the term of this patent is extended or adjusted under 35 U.S.C. 154(b) by 149 days.

(21) Appl. No.: 15/028,566

(22) PCT Filed: Nov. 10, 2014

(86) PCT No.: PCT/JP2014/079698
§ 371 (c)(1),
(2) Date: Apr. 11, 2016

(87) PCT Pub. No.: WO2015/079895
PCT Pub. Date: Jun. 4, 2015

(65) Prior Publication Data
US 2016/0297453 A1    Oct. 13, 2016

(30) Foreign Application Priority Data
Nov. 28, 2013   (JP) .................. 2013-245984

(51) Int. Cl.
*B61D 27/00*     (2006.01)
*B60H 1/00*      (2006.01)

(52) U.S. Cl.
CPC ..... *B61D 27/0018* (2013.01); *B60H 1/00371* (2013.01); *B60H 2001/00235* (2013.01)

(58) Field of Classification Search
CPC ...... B60H 1/00371; B60H 2001/00235; B60H 2001/3277; F28D 2021/0092; F25D 23/003; B61D 27/00; B61D 27/0018
(Continued)

(56) References Cited

U.S. PATENT DOCUMENTS 2,032,572 A * 3/1936 Hammers .......... B60H 1/00371
200/DIG. 30
2,750,868 A * 6/1956 Mieczkowski .......... F24F 11/76
454/343

(Continued)

FOREIGN PATENT DOCUMENTS

EP     2 287 026 A1    2/2011
GB     2472534 A       2/2011

(Continued)

OTHER PUBLICATIONS

International Search Report (PCT/ISA/210) dated Feb. 3, 2015, by the Japanese Patent Office as the International Searching Authority for International Application No. PCT/JP2014/079698.

(Continued)

*Primary Examiner* — Nelson J Nieves
(74) *Attorney, Agent, or Firm* — Buchanan Ingersoll & Rooney PC

(57) ABSTRACT

A vehicle air-conditioning apparatus includes a first damper opening and closing a first opening, a second damper opening and closing a second opening, and a control unit configured to control the first damper to close or partially open the first opening, and control the second damper to at least partially open the second opening, based on a value related to an outdoor air temperature and a reference value related to the value.

10 Claims, 4 Drawing Sheets

(58) Field of Classification Search
USPC .......................................... 62/186, 187, 428
See application file for complete search history.

(56) References Cited

U.S. PATENT DOCUMENTS

| | | | | |
|---|---|---|---|---|
| 3,026,042 A * | 3/1962 | Zoltok | ............... | B60H 1/00371 165/43 |
| 3,040,538 A * | 6/1962 | Alsing | ...................... | F24F 1/02 136/204 |
| 3,528,607 A * | 9/1970 | Plackett | ............. | B60H 1/00371 237/12.3 A |
| RE27,632 E * | 5/1973 | Plackett | ............. | B60H 1/00371 165/271 |
| 4,164,106 A * | 8/1979 | Klosz | ........................ | F24F 7/02 454/199 |
| 4,324,286 A * | 4/1982 | Brett | .................. | B60H 1/00371 165/202 |
| 4,592,207 A * | 6/1986 | Rummel | ............ | B60H 1/00371 62/244 |
| 4,608,834 A * | 9/1986 | Rummel | ............ | B60H 1/00378 296/216.02 |
| 4,732,011 A * | 3/1988 | Haiya | ................ | B60H 1/00371 62/244 |
| 4,815,530 A * | 3/1989 | Scott | ........................ | F24F 13/20 165/134.1 |
| 5,158,486 A * | 10/1992 | Tamame | ................. | F24F 13/20 160/368.1 |
| 6,763,668 B1 * | 7/2004 | Bushnell | ............ | B60H 1/00371 62/244 |
| 2005/0210908 A1 * | 9/2005 | Chee | ........................ | F24F 1/022 62/310 |
| 2007/0246209 A1 * | 10/2007 | Lee | ........................ | B60H 1/004 165/202 |
| 2008/0223054 A1 * | 9/2008 | Burns | ................ | B60H 1/00835 62/186 |
| 2009/0107158 A1 * | 4/2009 | Youn | .................... | B60H 1/3202 62/239 |
| 2009/0217689 A1 * | 9/2009 | Chakiachvili | ...... | B60H 1/00364 62/239 |
| 2010/0120345 A1 * | 5/2010 | Ryan | ................... | B60H 1/00371 454/75 |
| 2010/0147000 A1 * | 6/2010 | Swartz | ............... | B60H 1/00571 62/244 |
| 2011/0053484 A1 | 3/2011 | Yuasa | | |
| 2011/0067421 A1 | 3/2011 | Shiraishi et al. | | |
| 2011/0073746 A1 * | 3/2011 | Padiotis | .................... | F24F 1/50 248/674 |
| 2012/0065795 A1 * | 3/2012 | Blackshaw | ............... | F24F 11/30 700/295 |
| 2013/0174882 A1 * | 7/2013 | Ellenbecker | ............... | F24F 1/58 135/115 |
| 2017/0136848 A1 * | 5/2017 | Trutnovsky | ........ | B60H 1/00849 |

FOREIGN PATENT DOCUMENTS

| | | |
|---|---|---|
| JP | 52-51368 | 11/1977 |
| JP | 60-7258 Y2 | 3/1985 |
| JP | 61-52556 U | 4/1986 |
| JP | 63-12031 B2 | 3/1988 |
| JP | 3-193554 | 8/1991 |
| JP | 7-228249 A | 8/1995 |
| JP | 2000043553 A * | 2/2000 |
| JP | 2013-173410 A | 9/2013 |
| JP | 2013-193631 A | 9/2013 |

OTHER PUBLICATIONS

Written Opinion (PCT/ISA/237) dated Feb. 3, 2015, by the Japanese Patent Office as the International Searching Authority for International Application No. PCT/JP2014/079698.

Extended European Search Report dated Jun. 30, 2017, issued by the European Patent Office in corresponding European Application No. 14865712.5. (6 pages).

* cited by examiner

VEHICLE AIR-CONDITIONING APPARATUS AND RAILROAD VEHICLE INCLUDING THE SAME

TECHNICAL FIELD

The present invention relates to a vehicle air-conditioning apparatus and a railroad vehicle including the same.

BACKGROUND ART

An air-conditioning apparatus installed on a roof part of a railroad vehicle, which is operated in a subway, for example, is often used exclusively for cooling. In winter when heating is required, a railroad vehicle including such an air-conditioning apparatus supplies warm air into a cabin, by operating an electric heater provided below seats inside the cabin.

Generally, an indoor chamber and an outdoor chamber are formed inside a main body of a vehicle air-conditioning apparatus. An indoor air-sending device and an indoor heat exchanger are provided in the indoor chamber. A compressor, an outdoor air-sending device, and an outdoor heat exchanger are provided in the outdoor chamber.

There has been a conventional vehicle air-conditioning apparatus that has an outdoor air inlet formed in an upper part of a main body of the vehicle air-conditioning apparatus, and heats the inside of a cabin by introducing outdoor air into the main body through the outdoor air inlet during its heating operation, and exchanging heat between the outdoor air introduced into the main body and refrigerant flowing through a refrigerant pipe of an outdoor heat exchanger.

Also, there has been a conventional heat pump (cooling and heating) air-conditioning apparatus (Patent Literature 1) that includes an outdoor air-sending device provided at the center of an outdoor chamber, and outdoor heat exchangers provided on both side surfaces of the outdoor air-sending device, and discharges outdoor air, which is introduced into the main body from an outdoor air inlet formed in a side surface of the main body, through an outdoor air outlet formed in an upper surface of a main body.

Also, there has been a conventional air-conditioning apparatus (Patent Literature 2) that rotates an eccentric multi-blade outdoor air-sending device provided on an inner side surface of an outdoor chamber, to discharge outdoor air, which is sucked from an outdoor air inlet formed in the side surface of the outdoor chamber, through an outdoor air outlet formed in the side surface of the outdoor chamber. In the air-conditioning apparatus of Patent Literature 2, a partition plate is provided on the outdoor air outlet side inside the main body, so that it is spaced apart from a peripheral surface of the casing where the strongest centrifugal force is generated, within an area where a sufficient centrifugal force is generated, and thus an airflow containing relatively heavy substances such as snowflakes can be guided to the peripheral surface of the casing, and be discharged to the outside from the outlet.

CITATION LIST

Patent Literature

Patent Literature 1: Japanese Utility Model Publication No. 60-7258 (P. 1, P. 2, and FIG. 6)

Patent Literature 2: Japanese Unexamined Patent Application Publication No. 3-193554 (P. 3, P. 4, and FIG. 3)

SUMMARY OF INVENTION

Technical Problem

However, when it snows in winter, for example, snowflakes may pass through the outdoor air inlet and attach on the surface of blades of the outdoor air-sending device, or snowflakes may attach on the surface of the outdoor heat exchanger, in the vehicle air-conditioning apparatus that has the outdoor air inlet formed in the upper part of the main body of the vehicle air-conditioning apparatus, or the vehicle heat pump air-conditioning apparatus of Patent Literature 1. There has been a problem in that a fan motor rotating the outdoor air-sending device may be overloaded, when the heating operation is performed in this state. There has also been a problem in that heat exchange is inhibited, due to freezing of the snowflakes attached on the surface of the outdoor heat exchanger. Moreover, there has also been a problem in that power consumption increases, when, during snow, the inside of the cabin is heated with an electric heater provided below the seats in the cabin, instead of performing the heating operation.

Also, since the vehicle air-conditioning apparatus of Patent Literature 2 uses the eccentric multi-blade fan as the outdoor air-sending device, there has been a problem in that it costs relatively higher than a propeller fan. In addition, since the partition plate is provided in the vehicle air-conditioning apparatus of Patent Literature 2, there has been a problem in that the configuration becomes complex.

The present invention has been made in view of the above problems, and aims to provide a vehicle air-conditioning apparatus and a railroad vehicle including the same, which facilitate continuous heat pump operation irrespective of the external environment, and which can reduce cost and power consumption as compared to conventional structures.

Solution to Problem

A vehicle air-conditioning apparatus of the present invention is provided in an upper part of a vehicle main body of a railroad vehicle, and includes an air-conditioning apparatus main body having a first opening formed in an upper part thereof, and a second opening formed in a lower part thereof, an outdoor heat exchanger provided inside the air-conditioning apparatus main body, an outdoor air-sending device provided inside the air-conditioning apparatus main body, and sending air to the outdoor heat exchanger, a first damper opening and closing the first opening, a second damper opening and closing the second opening, and a control unit configured to control the first damper to close or partially open the first opening, and control the second damper to at least partially open the second opening, based on a value related to an outdoor air temperature and a reference value related to the value.

A railroad vehicle of the present invention includes the vehicle air-conditioning apparatus of the present invention.

Advantageous Effects of Invention

According to the present invention, the control unit controls the first damper to close or partially open the first opening, and controls the second damper to at least partially open the second opening, based on the value related to the outdoor air temperature and the reference value related to the value. Hence, in particular, when it snows in winter, it is possible to inhibit substances such as snowflakes from passing through the first opening, and suck outdoor air into the vehicle air-conditioning apparatus through the second opening. Thus, it is possible to facilitate continuous heat pump operation irrespective of the external environment, and reduce cost and power consumption as compared to conventional structures.

DESCRIPTION OF EMBODIMENTS

Hereinafter, embodiments of the present invention will be described with reference to the drawings. Note that the relationship among sizes of the component members may differ from the actual relationship, in the following drawings including FIG. 1. Also, in the following drawings including FIG. 1, those assigned the same reference signs are the same, or in an equivalent relationship, and the same can be said about the entire description. Moreover, forms of the components described in the entire description are only an example, and the forms are not limited to the descriptions.

Embodiment 1

Figure 1:
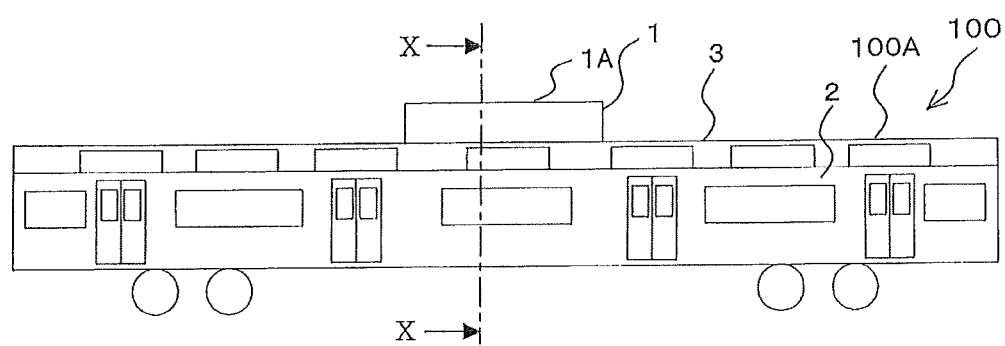
FIG. 1 is a side view of a railroad vehicle 100 according to Embodiment 1.
Figure 2:
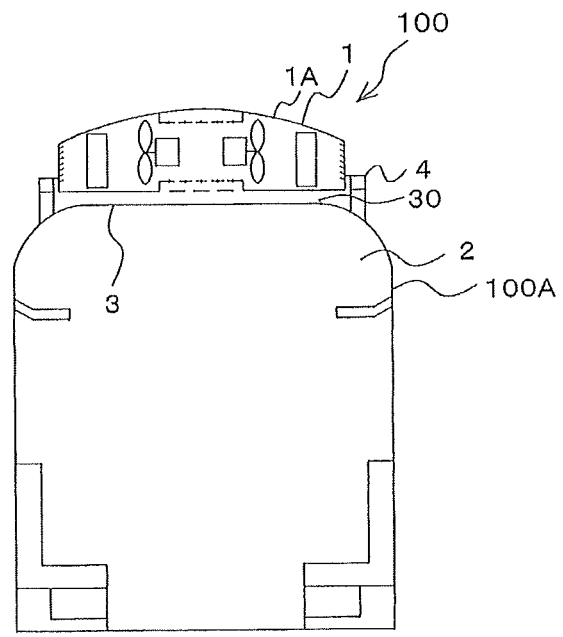
FIG. 2 is a cross-sectional view taken along line X-X of FIG. 1.

FIG. 1 is a side view of a railroad vehicle 100 according to Embodiment 1. FIG. 2 is a cross-sectional view taken along line X-X of FIG. 1. As shown in FIGS. 1 and 2, the railroad vehicle 100 includes a vehicle air-conditioning apparatus 1, a vehicle main body 100A, and a temperature detection unit 20.

The vehicle air-conditioning apparatus 1 is a heat pump (cooling and heating) air-conditioning apparatus, for example, having an air-conditioning apparatus main body 1A. The air-conditioning apparatus main body 1A is a member constituting the contour of the vehicle air-conditioning apparatus 1. An internal structure of the air-conditioning apparatus main body 1A will be described in detail with reference to FIGS. 3 and 4. The vehicle main body 100A is a member constituting the contour of the railroad vehicle 100. A cabin 2 is provided inside the vehicle main body 100A. A roof 3 constitutes an upper part of the vehicle main body 100A. The vehicle main body 100A has a supporting member 4 connected in an upper part of the vehicle main body 100A.

Figure 3:
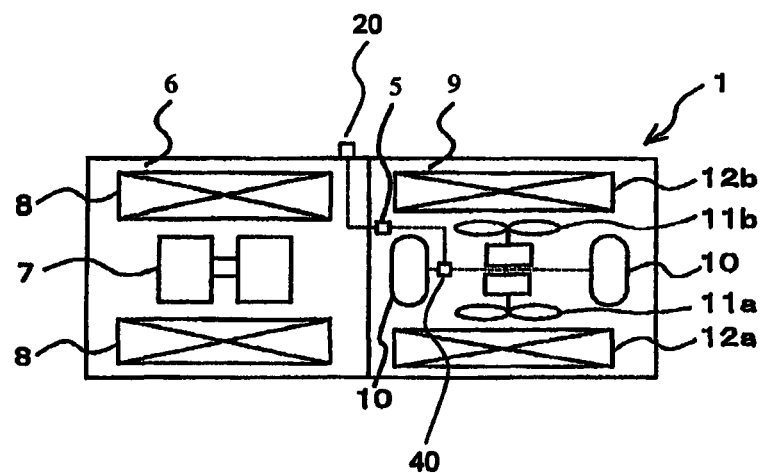
FIG. 3 is a plan view of an internal structure of a vehicle air-conditioning apparatus 1 of the railroad vehicle 100, according to Embodiment 1.

FIG. 3 is a plan view of the internal structure of the vehicle air-conditioning apparatus 1 of the railroad vehicle 100, according to Embodiment 1. As shown in FIG. 3, the inside of the vehicle air-conditioning apparatus 1 is partitioned, and an indoor chamber 6 and an outdoor chamber 9 are formed. A control unit 5, an indoor air-sending device 7, indoor heat exchangers 8, and an indoor fan motor (not shown) are provided in the indoor chamber 6. Compressors 10, outdoor air-sending devices 11a and 11b, outdoor heat exchangers 12a and 12b, and an outdoor fan motor (not shown) are provided in the outdoor chamber 9.

The control unit 5 controls operation of the vehicle air-conditioning apparatus 1, for example, and is configured of hardware such as a circuit device, or software executed on a microcomputer or a processor such as a CPU, that implements this function, for example. The temperature detection unit 20 detects the outdoor air temperature and other related factors, and is configured of a thermistor, for example.

The indoor air-sending device 7 is configured of a centrifugal air-sending device (sirocco fan), for example. The indoor air-sending device 7 has a function of guiding air in the cabin 2 to the indoor heat exchanger 8. The indoor heat exchanger 8 has fins (not shown) and a refrigerant pipe (not shown). The indoor heat exchangers 8 are each provided on the outer side of the indoor air-sending device 7 in the width direction of the vehicle air-conditioning apparatus 1. The indoor heat exchanger 8 functions as an evaporator during the cooling operation, and functions as a condenser during the heating operation, by switching a four-way valve (not shown).

The compressor 10 discharges refrigerant circulating through a refrigeration cycle after compressing it into high-temperature high-pressure refrigerant, and is arranged in a pair with a predetermined gap in between, in the longitudinal direction of the vehicle air-conditioning apparatus 1, for example. The outdoor air-sending devices 11a and 11b are configured of axial air-sending devices (propeller fans), for example, and are arranged between the pair of compressors 10, for example. The outdoor heat exchangers 12a and 12b are provided on the outer side of the outdoor air-sending devices 11a and 11b, in the width direction of the vehicle air-conditioning apparatus 1. The outdoor heat exchangers 12a and 12b each functions as a condenser during the cooling operation, and functions as an evaporator during the heating operation, by switching a four-way valve (not shown).

A brief description will be given below on how the vehicle air-conditioning apparatus 1 moves during operation.

When operation of the vehicle air-conditioning apparatus 1 is started, the control unit 5 drives the indoor fan motor and the outdoor fan motor. Drive of the indoor fan motor rotates the indoor air-sending device 7, while drive of the outdoor fan motor rotates the outdoor air-sending devices 11a and 11b.

Rotation of the indoor air-sending device 7 guides air in the cabin 2 to the indoor heat exchanger 8. Then, heat is exchanged between the air guided to the indoor heat exchanger 8, and the refrigerant guided to the indoor heat exchanger 8. Also, rotation of the outdoor air-sending devices 11a and 11b guides outdoor air (outside air) to the outdoor heat exchangers 12a and 12b. Then, heat is exchanged between the outdoor air guided to the outdoor heat exchangers 12a and 12b, and the refrigerant flowing through the refrigerant pipes inside the outdoor heat exchangers 12a and 12b.

Next, a brief description will be given on how the vehicle air-conditioning apparatus 1 moves during the heating operation. During the heating operation, the indoor heat exchanger 8 functions as a condenser, while the outdoor heat exchangers 12a and 12b function as evaporators.

The refrigerant compressed by the compressor 10 is guided to the indoor heat exchanger 8, and exchanges heat with air guided to the indoor heat exchanger 8 by rotation of the indoor air-sending device 7. The air guided to the indoor heat exchanger 8 exchanges heat with the refrigerant guided to the indoor heat exchanger 8, and is guided to the cabin 2.

The refrigerant having exchanged heat with the air guided to the indoor heat exchanger 8, is depressurized by an expansion valve (not shown), for example, and is guided to the outdoor heat exchangers 12a and 12b. The refrigerant guided to the outdoor heat exchangers 12a and 12b exchanges heat with air guided to the outdoor heat exchangers 12a and 12b by rotation of the outdoor air-sending devices 11a and 11b, and is guided to the compressor 10. The air guided to the outdoor heat exchangers 12a and 12b exchanges heat with the refrigerant guided to the outdoor heat exchangers 12a and 12b, and is guided to the outside of the vehicle air-conditioning apparatus 1.

Figure 4:
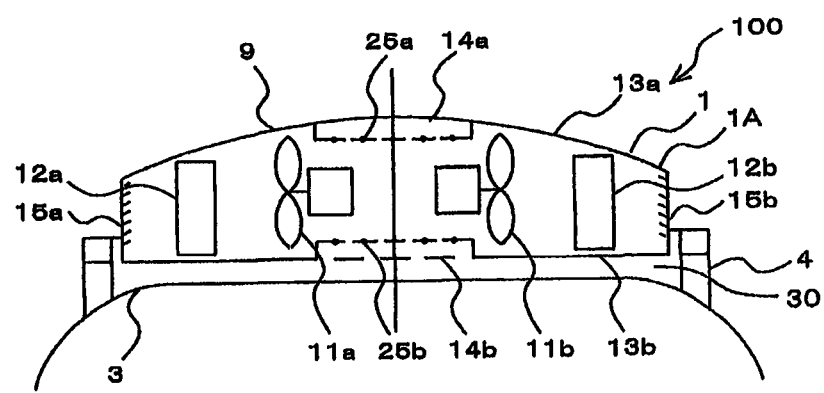
FIG. 4 is a diagram of the internal structure of the vehicle air-conditioning apparatus 1 of the railroad vehicle 100, according to Embodiment 1.

FIG. 4 is a diagram of the internal structure of the vehicle air-conditioning apparatus 1 of the railroad vehicle 100, according to Embodiment 1. As shown in FIG. 4, the air-conditioning apparatus main body 1A includes an outdoor upper surface cover 13a, and a bottom plate 13b. A first opening 14a, a second opening 14b, and outdoor air outlets 15a and 15b are formed in the air-conditioning apparatus main body 1A. A gap 30 is formed between the railroad vehicle 100 and the vehicle air-conditioning apparatus 1. The gap 30 is a space for guiding outdoor air into the vehicle air-conditioning apparatus 1, through the second opening 14b (to be described later).

The first opening 14a is an opening for guiding outdoor air into the vehicle air-conditioning apparatus 1. The first opening 14a is formed around the center in the width direction of the outdoor upper surface cover 13a. A first damper 25a opening and closing the first opening 14a, is provided in the first opening 14a.

The second opening 14b is an opening for guiding outdoor air into the vehicle air-conditioning apparatus 1. The second opening 14b is formed around the center in the width direction of the bottom plate 13b. A second damper 25b opening and closing the second opening 14b, is provided in the second opening 14b.

Figure 7:
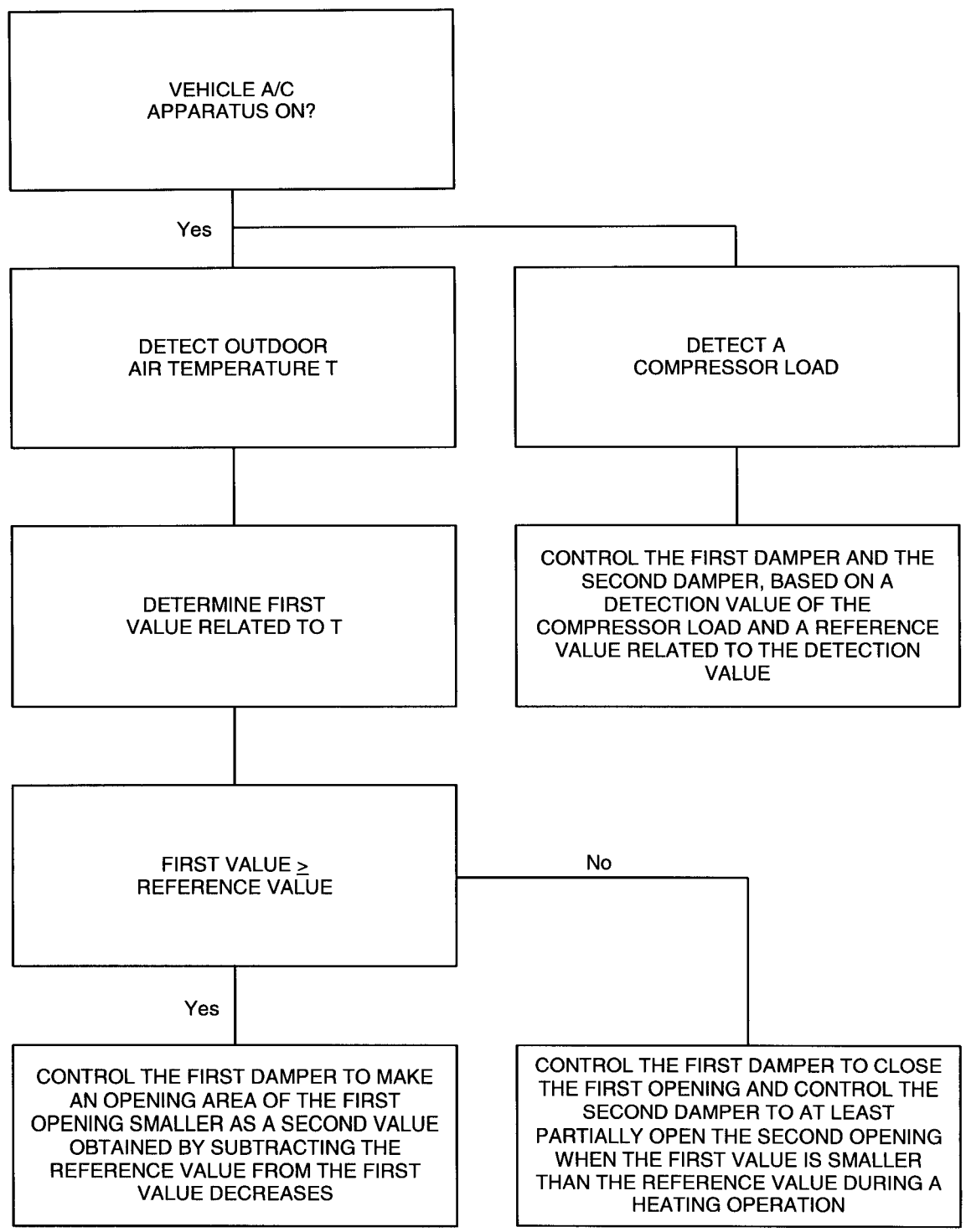
FIG. 7 is a diagram of the operation of the control unit.

As shown in FIG. 7, control unit 5 controls the first damper 25a and the second damper 25b. The control unit 5 controls the first damper 25a and the second damper 25b, based on the detection result of the temperature detection unit 20, for example. Specifically, for example, if information obtained by the temperature detection unit 20 is smaller than a reference value, the control unit 5 controls the first damper 25a to close the first opening 14a, and controls the second damper 25b to open the second opening 14b.

As shown in FIG. 4, the outdoor air-sending devices 11a and 11b are provided on the left and right of a center part of the outdoor chamber 9, for example. The outdoor air-sending device 11a is arranged, so that the sucked air is discharged toward the outdoor heat exchanger 12a and the outdoor air outlet 15a. The outdoor air-sending device 11b is arranged, so that the sucked air is discharged toward the outdoor heat exchanger 12b and the outdoor air outlet 15b. Note that a single unit of a double axial air-sending device may be used as a substitute for the outdoor air-sending devices 11a and 11b.

A description will be given below on how outdoor air flows, when a detection value of the temperature detection unit 20 is not smaller than the reference value (e.g., in midsummer when the cooling operation is performed), for example, with reference to FIG. 4. At this time, if the detection value of the temperature detection unit 20 is not smaller than the reference value, the control unit 5 judges that it is not snowing in winter, and controls the first damper 25a to open the first opening 14a, and also controls the second damper 25b to open the second opening 14b.

When the outdoor air-sending devices 11a and 11b are operated while the first opening 14a and the second opening 14b are open, outdoor air flows into the air-conditioning apparatus main body 1A through the first opening 14a and the second opening 14b, and circulates inside the air-conditioning apparatus main body 1A. The outdoor air having circulated inside the air-conditioning apparatus main body 1A is discharged to the outside of the air-conditioning apparatus main body 1A, through the outdoor air outlets 15a and 15b. Thus, the air capacity of the outdoor air-sending devices 11a and 11b is increased, so that elevation in high pressure of the refrigeration cycle can be controlled.

Note that when a detection value of the temperature detection unit 20 is not smaller than the reference value, the control unit 5 may control the first damper 25a to open the first opening 14a, and control the second damper 25b to close the second opening 14b.

Next, a description will be given on how outdoor air flows, when a detection value of the temperature detection unit 20 is smaller than the reference value (e.g., when the heating operation is performed), for example, with reference to FIG. 4. At this time, if the detection value of the temperature detection unit 20 is smaller than the reference value, the control unit 5 judges that it is snowing in winter, and controls the first damper 25a to close the first opening 14a, and also controls the second damper 25b to open the second opening 14b.

When the outdoor air-sending devices 11a and 11b are operated while the first opening 14a is closed and the second opening 14b is open, outdoor air passes through the second opening 14b, and is introduced into the outdoor heat exchangers 12a and 12b. The refrigerant flowing through the outdoor heat exchangers 12a and 12b absorb heat from the outdoor air introduced into the outdoor heat exchangers 12a and 12b, and is guided to the compressor 10. The outdoor air introduced into the outdoor heat exchangers 12a and 12b exchanges heat with the refrigerant flowing through the outdoor heat exchangers 12a and 12b, and then passes through the outdoor air outlets 15a and 15b to be discharged to the outside of the air-conditioning apparatus main body 1A.

Thus, in particular, when it snows in winter, the cabin 2 can be heated without using a separate heating unit such as an electric heater, inside the railroad vehicle 100. For this reason, cost and power consumption can be reduced, as compared to a conventional structure.

Note that although in the above description an example has been used, where the control unit 5 controls the first damper 25a and the second damper 25b based on the detection value of the temperature detection unit 20, the invention is not limited to this example. For example, a configuration may be employed in which a control unit controlling the first damper 25a, and a control unit controlling the second damper 25b are provided separately.

Also, a configuration may be employed, for example, where the control unit 5 controls the first damper 25a and the second damper 25b in a stepwise manner, based on the detection value of the temperature detection unit 20. Specifically, for example, the control unit 5 controls the first damper 25a to partially open the first opening 14a, and control the second damper 25b to partially open the second opening 14b. More specifically, for example, the control unit 5 controls the first damper 25a so that the opening area of the first opening 14a becomes smaller as the value obtained by subtracting the reference value from the detection value of the temperature detection unit 20 is smaller, and controls the second damper 25b so that the opening area of the second opening 14b becomes larger as the value obtained by subtracting the reference value from the detection value of the temperature detection unit 20 is smaller.

Also, as shown in FIG. 7, a configuration may be employed, for example, where the control unit 5 controls the first damper 25a and the second damper 25b, by also considering information obtained by other sensors, in addition to the detection value of the temperature detection unit 20. Specifically, for example, a load detection unit 40 for detecting load may be provided, and the control unit 5 may control the first damper 25a and the second damper 25b based on the detection value of the load detection unit 40, which is a value related to the outdoor air temperature. Note that the load detection unit 40 is configured of a device that measures the rotation speed of the compressor 10, for example.

Also, a configuration may be employed, for example, where the control unit 5 controls the first damper 25a and the second damper 25b based on a preset value. The preset value is a value related to time, for example, and is stored in a storage unit (not shown) of the control unit 5, for example. The control unit 5 controls the first damper 25a and the second damper 25b based on this value related to time. Specifically, for example, the control unit 5 controls the first damper 25a to close the first opening 14a and controls the second damper 25b to open the second opening 14b, when a predetermined time period (e.g., four hours) passes after the start of operation of the vehicle air-conditioning apparatus 1.

As has been described, the vehicle air-conditioning apparatus 1 according to this Embodiment 1 is provided in an upper part of the vehicle main body 100A of the railroad vehicle 100, and includes the air-conditioning apparatus main body 1A having the first opening 14a formed in the upper part thereof, and the second opening 14b formed in the lower part thereof, the first damper 25a opening and closing the first opening 14a, the second damper 25b opening and closing the second opening 14b, and the control unit 5 configured to control the first damper 25a to close or partially open the first opening 14a, and control the second damper 25b to at least partially open the second opening 14b, based on a value related to the outdoor air temperature and a reference value related to the value.

Hence, in particular, when it snows in winter, it is possible to inhibit substances such as snowflakes from passing through the first opening 14a, and suck outdoor air into the vehicle air-conditioning apparatus 1 through the second opening 14b. Thus, it is possible to facilitate continuous heat pump operation irrespective of the external environment, and reduce cost and power consumption as compared to the conventional structure.

Embodiment 2

Figure 5:
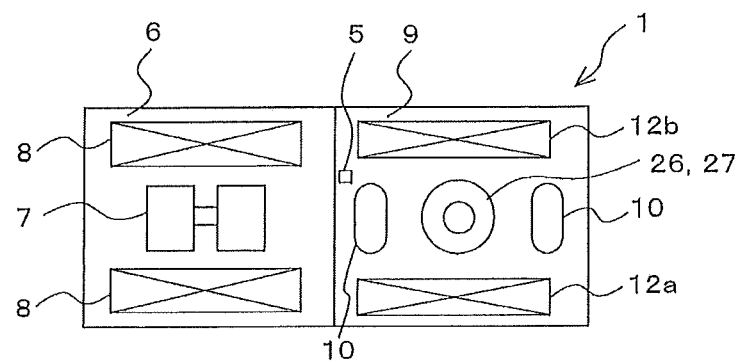
FIG. 5 is a plan view of an internal structure of a vehicle air-conditioning apparatus 1 of a railroad vehicle 100, according to Embodiment 2.
Figure 6:
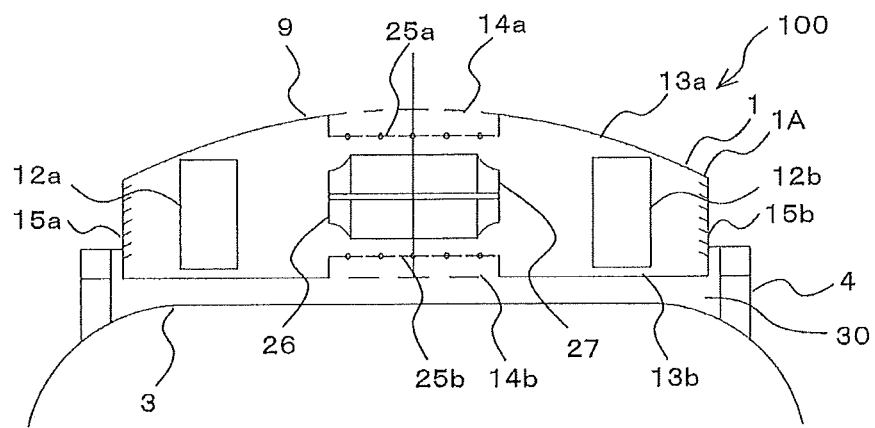
FIG. 6 is a diagram of the internal structure of the vehicle air-conditioning apparatus 1 of the railroad vehicle 100, according to Embodiment 2.

Next, a description will be given of a vehicle air-conditioning apparatus 1 according to Embodiment 2. The same structures as Embodiment 1 are assigned the same reference signs, and descriptions thereof are omitted. FIG. 5 is a plan view of an internal structure of the vehicle air-conditioning apparatus 1 of a railroad vehicle 100, according to Embodiment 2. FIG. 6 is a diagram of the internal structure of the vehicle air-conditioning apparatus 1 of the railroad vehicle 100, according to Embodiment 2.

As shown in FIGS. 5 and 6, an outdoor air-sending device 26 and an outdoor air-sending device 27 are provided in a center part of an outdoor chamber 9. The outdoor air-sending devices 26 and 27 are each configured of a centrifugal air-sending device (turbo fan), for example. Note that a single unit of a double axial air-sending device may be used as a substitute for the outdoor air-sending devices 26 and 27. Also note that a first damper 25a and a second damper 25b of Embodiment 2 are controlled in the same manner as the first damper 25a and the second damper 25b of Embodiment 1, and thus descriptions thereof are omitted.

As has been described, the vehicle air-conditioning apparatus 1 according to Embodiment 2 has the same effects as the vehicle air-conditioning apparatus 1 according to Embodiment 1. Moreover, in Embodiment 2, the outdoor air-sending devices 26 and 27 are each configured of a turbo air-sending device, so that the noise can be made smaller than in Embodiment 1, where the outdoor air-sending devices 11a and 11b are each configured of a propeller fan air-sending device.

REFERENCE SIGNS LIST 1 vehicle air-conditioning apparatus 1A air-conditioning apparatus main body 2 cabin 3 roof 4 supporting member 5 control unit 6 indoor chamber 7 indoor air-sending device 8 indoor heat exchanger 9 outdoor chamber 10 compressor 11a, 11b outdoor air-sending device 12a, 12b outdoor heat exchanger 13a outdoor upper surface cover 13b bottom plate 14a first opening 14b second opening 15a, 15b outdoor air outlet 25a first damper 25b second damper 26, 27 outdoor air-sending device 30 gap 100 railroad vehicle 100A vehicle main body

The invention claimed is:

1. A vehicle air-conditioning apparatus provided for an upper part of a vehicle main body of a railroad vehicle, comprising:
   a compressor for compressing a refrigerant in a refrigeration circuit;
   an air-conditioning apparatus main body having a first outdoor air inlet opening positioned for guiding outdoor air directly into the air-conditioning apparatus main body, the first outdoor air inlet opening formed in an uppermost p art of the air-conditioning apparatus main body, and a second outdoor air inlet opening positioned for guiding the outdoor air directly into the air-conditioning apparatus main body, the second outdoor air inlet opening formed in a lower part of the air-conditioning apparatus main body;
   an outdoor heat exchanger provided inside the air-conditioning apparatus main body;
   a fan provided inside the air-conditioning apparatus main body, and sending the outdoor air guided from the first outdoor air inlet opening and from the second outdoor air inlet opening, to the outdoor heat exchanger;
   a first damper configured to open or close the first outdoor air inlet opening;
   a second damper configured to open or close the second outdoor air inlet opening;
   a temperature sensor configured to detect an outdoor air temperature; and
   a controller configured to control the first damper to close or partially open the first outdoor air inlet opening, and control the second damper separately from the first damper to at least partially open the second outdoor air inlet opening, based on a first value related to the outdoor air temperature detected by the temperature sensor and a first reference value related to the first value.

2. The vehicle air-conditioning apparatus of claim 1, wherein
the controller is configured to control the first damper to make an opening area of the first outdoor air inlet opening smaller as a second value obtained by subtracting the first reference value from the first value decreases.

3. The vehicle air-conditioning apparatus of claim 1, wherein
the controller is configured to control the first damper to close the first outdoor air inlet opening and control the second damper to at least partially open the second outdoor air inlet opening, when the first value is smaller than the first reference value, during a heating operation.

4. The vehicle air-conditioning apparatus of claim 1, comprising:
a load detector for measuring a rotation speed of the compressor, wherein the controller is configured to control the first damper and the second damper, based on a detection value of the load detector, and a second reference value related to the detection value.

5. The vehicle air-conditioning apparatus of claim 1, wherein
the fan is an axial fan or a centrifugal fan.

6. A railroad vehicle, comprising:
an air-conditioning apparatus main body arranged in an upper part of the railroad vehicle, the air-conditioning apparatus main body including:
a compressor for compressing a refrigerant in a refrigeration circuit;
a first outdoor air inlet opening arranged for guiding outdoor air directly into the air-conditioning apparatus main body, the first outdoor air inlet opening formed in an uppermost part of the air-conditioning apparatus main body;
a second outdoor air inlet opening arranged for guiding the outdoor air directly into the air-conditioning apparatus main body, the second outdoor air inlet opening formed in a lower part of the air-conditioning apparatus main body;
an outdoor heat exchanger provided inside the air-conditioning apparatus main body;
a fan provided inside the air-conditioning apparatus main body, and sending the outdoor air guided from the first outdoor air inlet opening and from the second outdoor air inlet opening, to the outdoor heat exchanger;
a first damper configured to open or close the first outdoor air inlet opening;
a second damper configured to open or close the second outdoor air inlet opening;
a temperature sensor configured to detect an outdoor air temperature; and
a controller configured to control the first damper to close or partially open the first outdoor air inlet opening, and control the second damper separately from the first damper to at least partially open the second outdoor air inlet opening, based on a first value related to the outdoor air temperature detected by the temperature sensor and a first reference value related to the first value.

7. The railroad vehicle of claim 6, wherein
the controller is configured to control the first damper to make an opening area of the first outdoor air inlet opening smaller as a second value obtained by subtracting the first reference value from the first value decreases.

8. The railroad vehicle of claim 6, wherein
the controller is configured to control the first damper to close the first outdoor air inlet opening and control the second damper to at least partially open the second outdoor air inlet opening, when the first value is smaller than the first reference value, during a heating operation.

9. The railroad vehicle of claim 6, comprising:
a load detector for measuring a rotation speed of the compressor, wherein the controller is configured to control the first damper and the second damper, based on a detection value of the load detector, and a second reference value related to the detection value.

10. The railroad vehicle of claim 6, wherein
the fan is an axial fan or a centrifugal fan.

* * * * *